Figure 3:
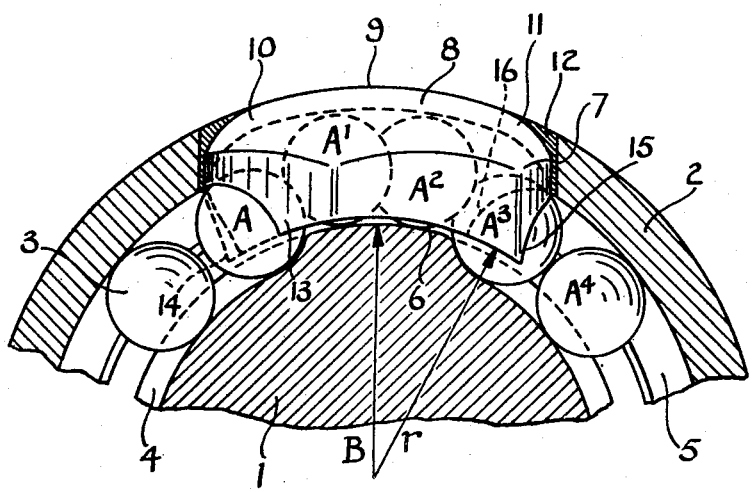

Nov. 18, 1952 J. G. DOUGLAS 2,618,166
SCREW AND NUT TRANSMISSION MECHANISM
Filed July 12, 1950 2 SHEETS—SHEET 1
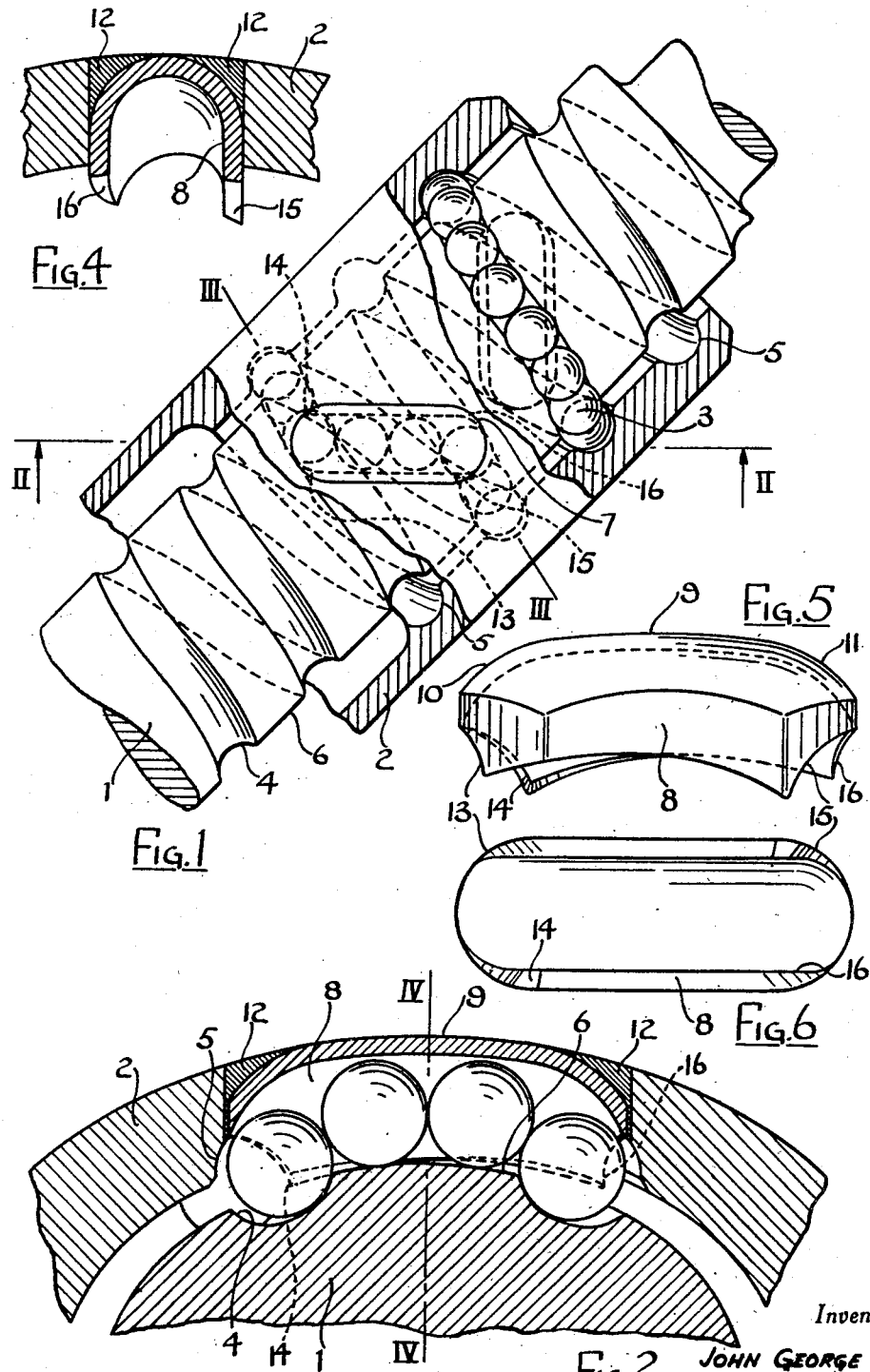
Inventor
JOHN GEORGE DOUGLAS
By Arthur M. Smith
Attorney Patented Nov. 18, 1952

2,618,166

UNITED STATES PATENT OFFICE 2,618,166

SCREW AND NUT TRANSMISSION MECHANISM

John George Douglas, Aberfeldy, Scotland

Application July 12, 1950, Serial No. 173,325

3 Claims. (Cl. 74—459)

This invention relates to screw and nut transmission mechanism of the kind described in my prior Patent No. 2,322,000 wherein the driving connection between complementary helical grooving formed in a nut and on a screw is constituted by a number of balls disposed in said grooving whereby rotation of one member relatively to the other results in relative axial movement with only rolling friction between the screw and nut members. To render the operation of such an arrangement continuous, it is necessary to provide a complete circuit for the balls such as by returning the balls from one end of the helical grooving or threads in the nut to the opposite end thereof.

This application is a continuation-in-part of my co-pending application Serial No. 675,790, filed June 10, 1946, now abandoned. It is an object of the present invention to provide improvements in or relating to the constructions disclosed in my said prior patent, such improvements being directed to simplifying the construction and providing a device of enhanced mechanical efficiency.

It is also an object of the present invention to provide improvements in transmission mechanism of the general type above described designed to simplify manufacture to meet certain conditions encountered in practice and render such mechanism applicable to a number of additional uses.

It is a further object of the invention to provide a transmission of the general type above described in which the balls, during transfer, undergo a minimum of directional change and inter-ball friction and in which the balls are subjected to a substantially constant inter-ball pressure throughout the entire ball transfer.

Prior to the present invention, there have been disclosed two distinct types of screw and nut transmissions. The first type is well illustrated by applicant's prior United States Patent No. 2,322,000 and British Patent No. 526,735 in which the ball circuit includes only a single helical turn and in which the transfer passage through which the balls are returned is formed within the walls of the nut itself.

In this type of transmission, the interior walls of the nut must be machined and finished with great accuracy so as to prevent friction between the walls of the nut and the balls and, also, so as to provide a smooth, constant transfer path to prevent a variance of pressure between the balls undergoing transfer. With such a construction, it has been found extremely difficult to form such a transfer path having the above characteristics due to the relatively small dimensions thereof, and due to the fact that tools for performing such machining and finishing must normally be inserted through the axial opening in the nut.

These difficulties prevented economical manufacture of screw and nut transmissions of this type and imposed definite limitations on the quality of operation which could reasonably be expected from such transmissions.

The second type of transmission is illustrated by the transmissions disclosed in United States patents, Nos. 1,272,589 and 2,380,662 in which the ball circuit includes a plurality of helical turns and in which it is necessary to return the balls via an excessively long external path out of contact with the screw threads and through a multi-curved transfer tube. These transmissions require an excessive number of balls to complete a circuit and require that the direction of movement of the balls during transfer be changed several times within a relatively short distance. This type of transmission, accordingly, has considerable friction and operates roughly due to jamming of the balls and uneven pressure between the balls as the same undergo changes in direction.

The transmission of the present invention is more closely concerned with improving the first type of transmission above referred to in that the present transmission utilizes a complete ball circuit which includes a single helical turn and the balls are returned while still in contact with the screw threads. However, the transmission construction disclosed herein distinguishes over applicant's prior patented structure and that of British Patent No. 526,735 in the provision of a novel, efficient and economically manufactured liner which is inserted into an aperture in the wall of the nut itself and which completely forms in itself a relatively frictionless path for the return of the balls. With this construction, the aperture in the nut may be formed without any particular accuracy or tolerances and the walls do not require machining or other finishing as is required in the prior constructions.

More particularly, and in contrast to the prior constructions referred to above, the said liner comprises an inverted U-shaped channel which is open at both ends so that the balls may be transferred without being first deflected into the transfer port normal to the longitudinal axis thereof. The liner has its ends cut away at an angle to the liner's longitudinal axis so that one of the walls of the liner extends beyond the other wall thereof to form a deflecting element for the balls. In such a construction, the liner itself provides a ball deflector within the channel and thus, the balls may be immediately directed longitudinally of the liner and through the channel therein.

The present liner is capable of being formed and finished with great accuracy yet cheaply prior to insertion into the aperture in the nut, thus, eliminating the necessity and difficulty of machining and otherwise finishing the relatively inaccessible walls of the transfer port from within the nut itself.

It may, also, be seen that by utilizing the transfer liner disclosed herein, a highly efficient, low friction and very economical transmission is obtained and one which can be quickly and easily manufactured by mass production methods while maintaining relatively great accuracy in the dimensions and contour of the ball transfer channel.

One embodiment of the present invention is shown in the accompanying drawings in which:

Fig. 1 is a longitudinal view of a screw and nut transmission unit with parts of the nut broken away to show the ball path, Fig. 2 is a fragmentary sectional view taken on the line II—II of Fig. 1, Fig. 3 is a fragmentary sectional view similar to Fig. 2 but showing the exterior of the liner and with the section taken into the thread grooves as indicated by the section line III—III in Fig. 1, Fig. 4 is a cross-sectional view taken on the line IV—IV of Fig. 2 but with the balls omitted for clearness, Fig. 5 is an elevation of the transfer element or liner shown in Figs. 1–3, and Fig. 6 is an inverted plan of the liner shown in Fig. 5.

In the construction illustrated, the improved screw and nut transmission mechanism comprises a screw-threaded spindle 1 which may, for example, form part of or be operated by the steering column of a vehicle, and a nut 2 disposed around said screw-threaded spindle and connected to the mechanism to be operated or controlled. The driving connection between the screw-threaded spindle 1 and the nut 2 is constituted by a number of balls 3 movably mounted in an unobstructed circulating path or endless circuit in the nut 2 embracing substantially one helical turn of the co-operating screw-grooves 4 and 5 formed in the spindle 1 and nut 2 respectively. The said path or circuit is rendered endless by deflector members which extend toward and terminate adjacent the screw crest to enclose substantially one helical groove of the screw-thread and by a transfer passage or port which enables the balls to pass from one groove to the adjacent groove over and in contact with the crest 6 intervening between the adjacent turns of the screw thread 4. To achieve this end, a slot 7 is formed in the wall of the nut 2, the said slot being of substantially rectangular form with semi-circular ends as shown in Fig. 1 and lying along an axis which is inclined to the axis of the nut 2. Into the slot 7 is adapted to be inserted a unitary device constituting a transfer element. This device comprises a liner 8 which has flat parallel walls connected by a portion of substantially semi-circular or U-shape internal cross-section as shown in Fig. 4 to receive the balls 3 and is bent or arched at 9 in the direction of its length as shown in Figs. 2 and 5 between its end portions 10 and 11. The mid-portion 9 of the liner, which is adapted to lie within the confines of the nut 2, permits the balls 3 to pass successively in either direction, according to the hand of rotation of the screw 1 or nut 2, over the crest 6 of the screw-thread 4 and around slightly less than one helical turn within the limits imposed by the deflecting ends of the liner 8.

In order to position the liner 8 it is soldered in place in the slot 7, parts of the solder matrix being indicated at 12 in Figs. 2 and 4. The solder preferably completely fills those parts of the slot 7 which are not occupied by the liner 8 and the outer part of the solder matrix may be finished off coincident with the outer surface of the nut 2. The arch or hump 9 (Figs. 2 and 5) of the liner 8 may be either coincident with the outer surface of the nut, or lie below that surface with the gap filled by the solder matrix 12. The wall thickness of the nut can thus be a factor independent of the ball diameter or the thickness of the liner wall. Instead of employing solder, any other convenient method of securing the liner 8 in operative position may be employed.

The ends of the liner 8 are open and are shaped to form deflecting and guiding elements 13, 14, 15 and 16 (Figs. 2, 3 and 6). The elements 14 and 15 are curved inwardly of the liner and chamfered or bevelled on their inner surfaces so as to eliminate sharp deflections and provide a smooth, unobstructed open path for the transfer of the balls 3 out of or into the load-carrying helix. The elements 13 and 16 are arranged to project across the otherwise open ends of the helical groove of the nut which are exposed by the slot 7, and serve to maintain a closed circuit for the balls which are maintained in contact with the screw groove 4 throughout the entire circuit including their movement through the transfer passage formed by the liner 8. The deflecting elements 13 and 16 are disposed within the transfer passage and are adapted to deflect the balls up onto screw-crest and substantially longitudinally of the liner. The path of ball movement through the liner 8 is shown by the broken line positions of the balls in Fig. 1 wherein the approximate positions of the deflecting elements 13, 14, 15 and 16 are also shown. The positions of these elements are also shown in Figs. 2 and 3. The internal width of the liner 8 and the distance of its arch 9 radially from the screw groove 4 and crest 6 are such that the balls 3 can pass freely, but without excessive looseness, through the channel formed by the liner 8 during transference from one end to the other of the working helix in either direction or hand of rotation, and so that the balls during such transference are entirely free from any load either radial or axial, such loads being taken entirely by the balls in the working helix substantially all of which are load bearing axially in either direction.

The initial or final contact point in the liner channel and on element 13 or 16 of the balls 3 is at A (Fig. 3) which coincides substantially with the pitch circle of the balls in the working helix, successive positions during transfer being indicated at $A^1$, $A^2$, $A^3$ and $A^4$. The deflector means into and out of the transfer passage and constituted by the guiding elements 13 and 16 make contact with the balls definitely beyond their half diameter so as to impart lift to the balls onto the screw-crest and so as to avoid or minimise the "squeeze angle" which would be detrimental to the smooth transfer of the balls over the screw crest by tending to force them deeper into screw-grooving, which occurs if the deflecting means do not contact the balls beyond half-diameter or inside their pitch-circle.

The screw crest diameter B (Fig. 3) is always slightly smaller than the pitch circle of the balls so that if the inner radius r of the side walls of the liner 8 and the deflector ends 13, 14, 15, 16 thereof just clear the crest by a running clearance, correct pick up and deflection and avoidance of "squeeze-angle" of the balls is satisfied, and elements 13, 16, need not enter the screw-groove. This arrangement enables the depth of the helical grooves 4 and 5 in both the screw and the nut to be nearly one-half the ball diameter for maximum axial loading.

The arrangement above-described may be multiplied by forming two or more independent ball circuits within the confines of one nut, each such circuit being completed by the insertion of a liner 8 as above described. For the sake of example two such independent ball circuits are shown in Fig. 1.

The device described above with reference to the drawings possesses the advantages of easy and straightforward manufacture by known engineering methods and means. The plain, continuous helical screw groovings at 4 and 5 can have any grooving profile desired, have run-out open ends and are easily machined, hardened and ground to great accuracy at small cost. This advantage is also obtained in making the transfer passage, the deflecting means as part of the liner 8 and in the very simple assembly of the device, which contains all the factors essential for efficient and commercially successful operation.

I claim:

1. A screw and nut transmission mechanism comprising a screw and a nut having complementary helical grooving formed therein, a plurality of balls constituting the driving connection between said screw and nut, said nut having an elongated aperture therein extending obliquely with respect to the axis thereof between the ends of less than one helical groove convolution, and a liner open on its inner side so as to be substantially U-shaped in cross section positioned in said aperture wholly within the confines of said nut and having four inwardly extending components extending in planes parallel to the longitudinal axis of said liner which extend toward and terminate adjacent the screw crest, two alternate members of said components extending toward the screw grooving to enclose substantially one helix turn and define the closed circuit for the balls and two other alternate members of said components disposed to engage each ball beyond its half diameter so as to smoothly deflect the balls into and out of the screw grooves to pass over the intervening crest in engagement therewith, said liner being open at its ends so that the balls may enter and leave the same substantially in the direction of the longitudinal axis thereof to permit transfer of the balls with a minimum of directional change.

2. A screw and nut transmission mechanism as claimed in claim 1 and further characterized in that the said liner is curved in the direction of its length to permit the balls to pass successively in either direction over and in contact with the crest between adjacent helical turns of the screw grooving.

3. A screw and nut transmission including a screw and a nut having complementary helical grooving formed therein, a plurality of balls constituting the driving connection between said screw and nut, and a transfer passage between two adjacent helical turns of the grooving comprising a liner which has its inner side and its ends open so as to be substantially U-shaped in cross section inserted into an aperture in the nut to lie wholly within the confines of the nut wall, said liner being curved in the direction of its length and shaped adjacent its ends to provide two depending elements which extend toward and terminate adjacent the screw crest to enclose substantially one helix turn to form the ball circulation path, said depending elements having their inner surfaces chamfered to form smooth unobstructive deflecting elements disposed within the transfer passage and adapted to engage each ball beyond its half diameter and deflect the balls smoothly in a direction substantially longitudinally of the liner, and two alternate elements extending to a greater depth than said first-named elements toward the screw grooving and form a closed circuit for the balls, said second-named elements being cut back to facilitate entry of the balls into the said liner in a direction substantially along the longitudinal axis of the liner.

JOHN GEORGE DOUGLAS.

REFERENCES CITED

The following references are of record in the file of this patent:

UNITED STATES PATENTS

| Number | Name | Date |
|---|---|---|
| 1,272,589 | Whitney | July 16, 1918 |
| 2,322,000 | Douglas | June 15, 1943 |
| 2,380,662 | Means | July 31, 1945 |

FOREIGN PATENTS

| Number | Country | Date |
|---|---|---|
| 526,735 | Great Britain | Sept. 24, 1940 |